A. E. COOK.
TRUCK ATTACHMENT FOR AUTOMOBILES.
APPLICATION FILED OCT. 11, 1917.
1,350,006.
Patented Aug. 17, 1920.
3 SHEETS—SHEET 1.
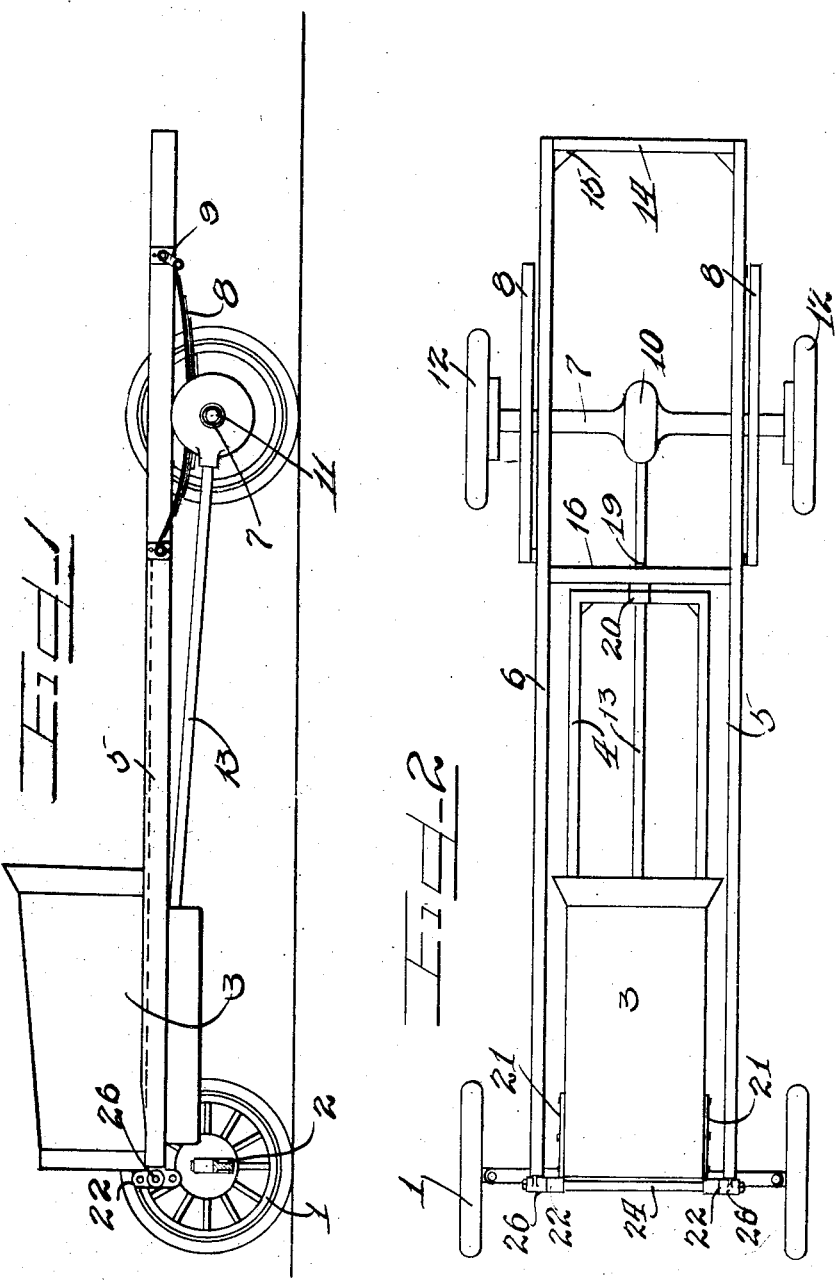

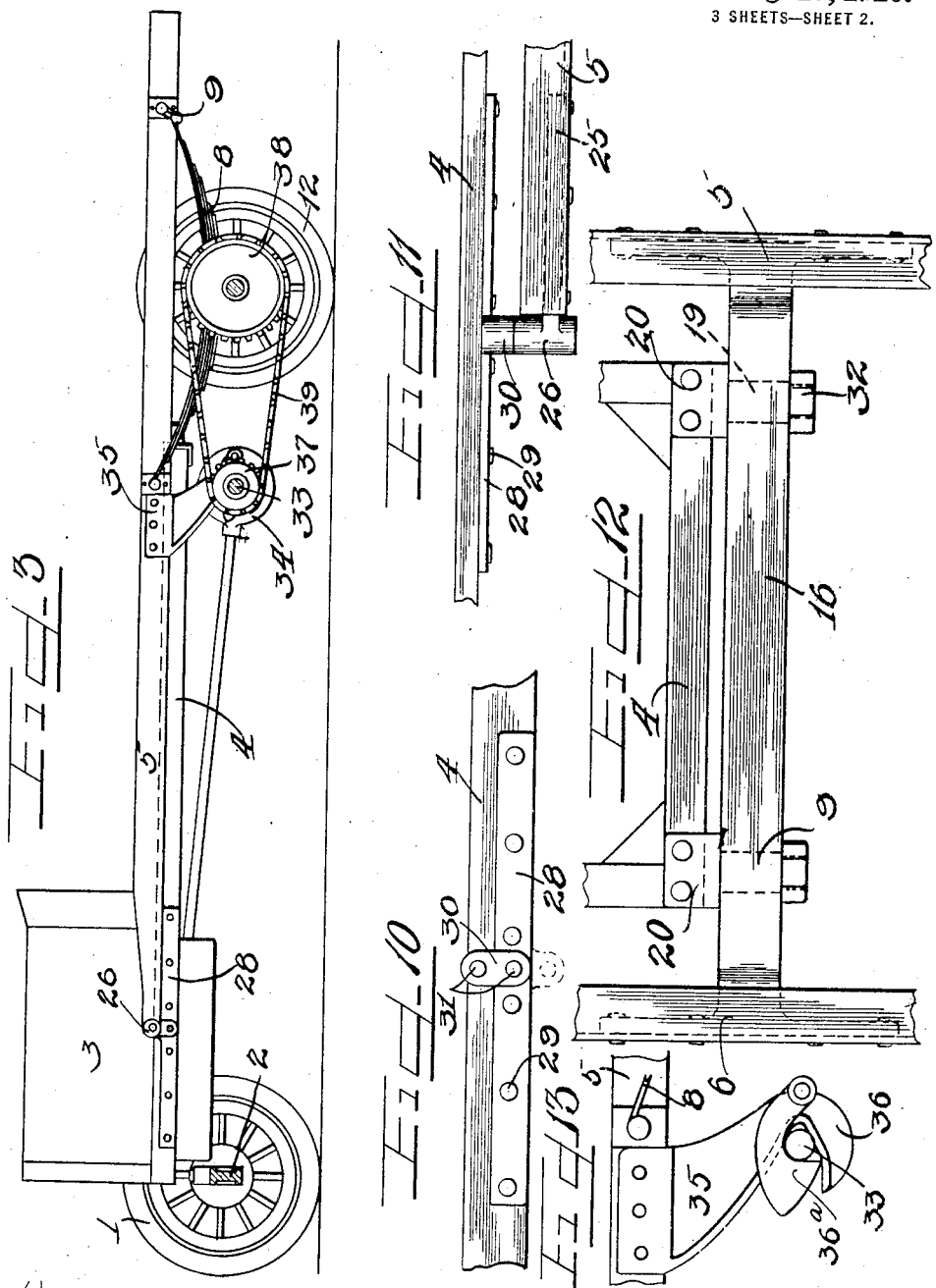

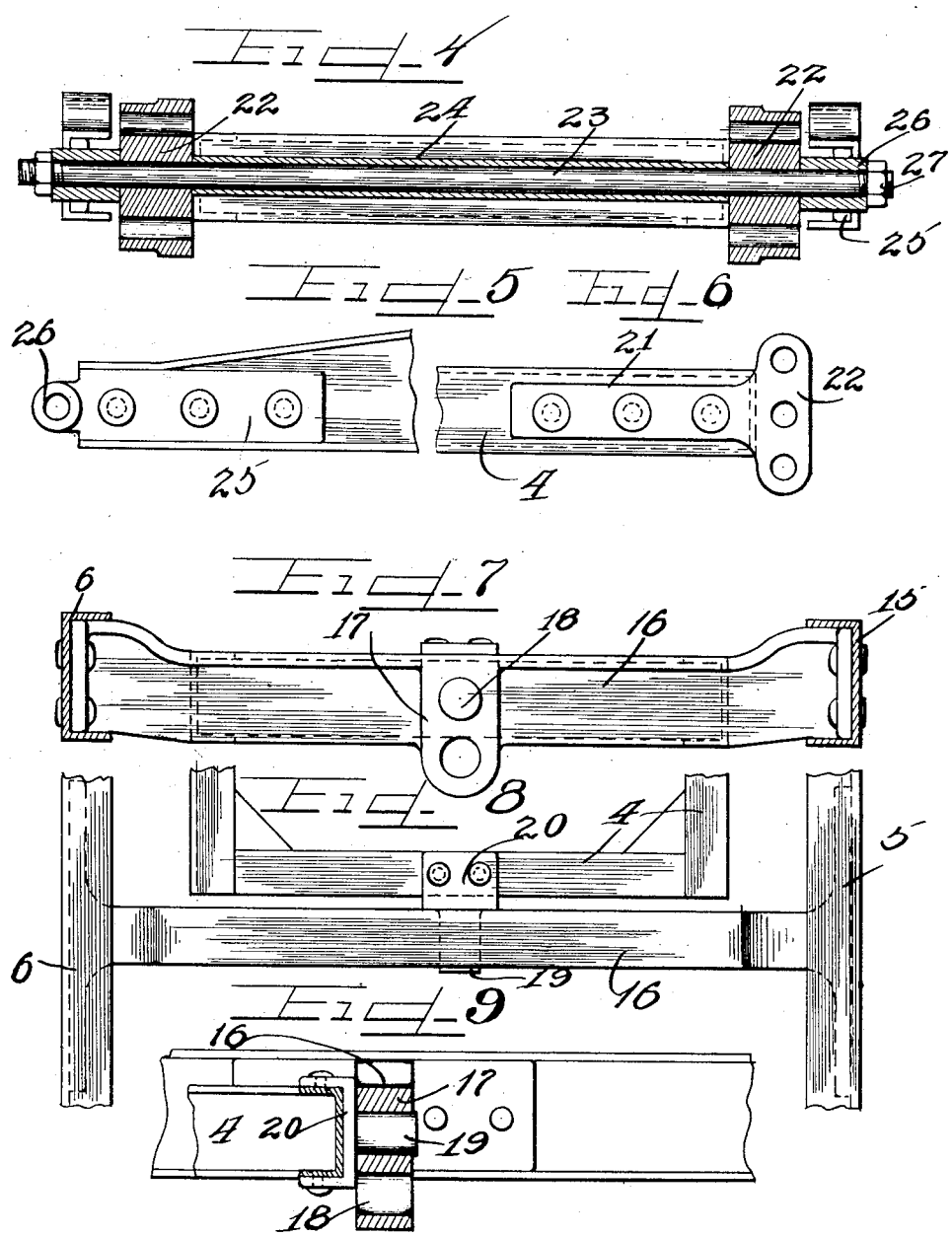

UNITED STATES PATENT OFFICE.

ALBERT E. COOK, OF CHICAGO, ILLINOIS.

TRUCK ATTACHMENT FOR AUTOMOBILES.

1,350,006.  Specification of Letters Patent.  Patented Aug. 17, 1920.

Application filed October 11, 1917. Serial No. 195,930.

*To all whom it may concern:*

Be it known that I, ALBERT E. COOK, a citizen of the United States, and a resident of the city of Chicago, in the county of Cook and State of Illinois, have invented certain new and useful Improvements in Truck Attachments for Automobiles; and I do hereby declare that the following is a full, clear, and exact description of the same, reference being had to the accompanying drawings, and to the numerals of reference marked thereon, which form a part of this specification.

It is an object of my invention to provide a truck unit adapted to be attached to any make of automobile, regardless of the make or size thereof, to transform any make of pleasure car into a truck or tractor for the purpose of heavy hauling or loading.

It is also an object of my invention to provide a truck attachment which is standardized, adapting one style or construction of attachment being used on any make of car regardless of the size thereof.

It is furthermore an object of this invention to provide a truck attachment which may be attached to a chassis of the underslung type or of the other types with equal facility and in which the truck frame assumes a substantially horizontal position when attached thereby minimizing the stress or strain on the part to which the attachment is secured.

It is furthermore an object of this invention to provide a truck attachment in which practically the entire weight of the load is supported by the truck wheels and axle and these so disposed that the weight of the load is uniformly distributed thereon to prevent as much as possible center sag of the truck frame.

The invention (in a preferred form) is more fully pointed out in the drawings, and defined in the specification.

On the drawings:

Figure 1 is a side view of an attachment embodying my invention, with the near wheels removed.

Fig. 2 is a top plan view thereof.

Fig. 3 is a view of the same truck attachment shown in Fig. 1, but illustrating a modified way of attaching the same to a chassis.

Fig. 4 is a sectional view of the means for attaching the front end of the truck to the chassis as shown in Fig. 1.

Fig. 5 shows one of the attaching arms or bearings.

Fig. 6 illustrates the attaching head.

Fig. 7 is a view of the central brace for the truck.

Fig. 8 illustrates the rear suspension of the chassis to the truck frame.

Fig. 9 is a section taken through the suspension.

Fig. 10 illustrates the method of attaching the truck to a larger or long frame car.

Fig. 11 is a top plan view thereof.

Fig. 12 illustrates a two-point suspension for the rear end of the car chassis.

Fig. 13 is an enlarged fragmentary detail of the suspension bearing for the differential shaft.

As shown on the drawings:

1, indicates the front wheels; 2, the front axle; 3, the hood containing the engine and other parts, and 4, the chassis frame.

The truck attachment comprises a truck unit comprising strong side channel frame members 5—6, supported on a rear truck axle housing 7, by means of springs 8, which at one end are pivoted to the frame members and at the opposite end connected by a link 9. The rear truck comprises the usual differential 10, and axle 11, to which the wheels 12, are attached. A drive shaft 13, extends from the transmission casing (not shown) to the differential for driving the rear wheels. Rigidly connecting the rear ends of the frame members 5—6, is a cross frame member or angle bar 14, and corner brace plates 15.

Rigidly connecting the frame members 5—6, at a point intermediate their ends, is a strong cross frame brace and suspension member 16, which is shown as a heavy angle iron and which is provided centrally with a boss, head or extension 17, having two apertures 18, therein, either of which is adapted to receive the suspension stud 19, therein, which is attached centrally to the rear end of the car chassis 4, by means of a clamp or member 20, which is rigidly bolted or riveted to the chassis frame.

The truck frame shown in Figs. 1 and 2, is attached to the front end of the chassis 4. As shown, an arm or bar 21, is rigidly bolted to each of the chassis side frame members 4, and each of said bars 21, is provided with a head 22, integral therewith having three sets of apertures therein, any of which is adapted to receive a shaft 23, therethrough. As shown, a spacing sleeve 24, is engaged on the shaft between the heads 22 and the ends of the shaft project beyond the heads 22. Rigidly bolted in the end of each channel frame member 5—6, is an arm or bar 25, having on the outer end thereof a boss or bearing 26, which engages on the stud ends of the shaft 23, and a nut 27, is threaded on each end of the shaft to hold the parts in assembled relation.

For the purpose of attaching the truck unit to cars of greater length than Ford and other small cars, an attaching member 28 is provided which may be attached to the chassis side frame members 4, at any desired place by means of bolts or rivets 29. A central head, extension or boss 30, is secured on said bar having two studs 31, one above the other, on either of which the bearing 26, may be engaged for supporting or suspending the front end of the truck unit. As shown also in this construction, a two-point suspension is provided for the rear end of the chassis frame. In this instance, two bosses 17, as before described, are provided, each of which is adapted to receive one stud 19, therein, and, as shown, a nut 32, is threaded on the end of the studs.

In this construction shown in Fig. 3, the axle 33, and differential 34, of the car are used and are suspended from the truck frame by means of a bearing bracket 35, provided with a hook 36, and a retaining hook, or member 36ª, is pivoted to the bracket, which engages the axle 33, and retains it in the bearing bracket. A sprocket 37, is attached to the end of each axle section 33, and a sprocket wheel 38, is attached to each wheel 12, around which a sprocket chain 39, is trained for the purpose of driving the truck wheels.

The operation is as follows:

The operation is readily seen from the foregoing description. With small cars the truck attachment is secured to the front end of the chassis, as shown in Figs. 1 and 2, and in large cars the same truck unit is attached to the chassis along the side members, as shown in Fig. 3.

Whether one point or a plurality of suspensions between the rear of the chassis and truck frame are used, is optional, and may be changed to suit the requirements.

By the use of the apertured head 17, in Figs. 1 and 2, and the reversible boss and studs in Figs. 3 and 10, the truck may be attached to any underslung car or any make of car, and the frame assumes a proper position. To compensate for different size of front auto wheels, and to avoid disturbing or contacting the usual brackets on the automobile frame, a sufficient clearance is provided between the chassis frame and the truck frame members, as shown in Figs. 2, 11 and 12. Of course, if desired, for any special reason the truck can be attached to have a forward inclination to the frame by adjusting the link 30, or shaft 23, to engage in different sets of apertures.

The truck frame is sufficiently wide to fit over any sized chassis used in any pleasure car made and may be quickly and readily attached thereto after the body is removed and forms a truck of a capacity depending only on the power of the pleasure car to which attached, as the truck attachment bears practically all the load and takes the strain off of the car chassis.

It is to be noted that a standard truck unit is provided, which may be attached to any pleasure car by simply removing the body and backing the chassis between the truck frame after which it is quickly attached.

Many details of construction may be varied and numerous changes may be made without departing from the principles of my invention. I therefore do not purpose limiting my application for patent otherwise than necessitated by the prior art.

I claim as my invention:

1. A truck attachment comprising in combination with a car chassis, a truck frame, a mechanism for connecting the frame to the front end of the chassis, a pivot suspension between the rear end of the chassis and truck frame, truck wheels and axle, a differential on the axle driven from the car engine, and springs supporting the truck frame on the truck axle.

2. A truck attachment for pleasure cars comprising in combination with the car frame, a truck attachment, and a shaft supported transversely across the front end of the car frame to support the front end of the truck attachment.

3. A truck attachment for pleasure cars comprising in combination with a car frame, a truck attachment, means for attaching the front end of the truck attachment to the front portion of the car frame, and a pivot suspension for the rear end of the car frame from the truck frame.

4. In a device of the class described, the combination with a car chassis of a truck frame, a shaft removably supported on the front end of the chassis, for supporting the front end of said truck frame, supporting means on said truck frame for supporting the rear end of said chassis, and truck wheels and an axle connected to the truck frame and driven from the power plant of the car.

5. A truck unit comprising side frame members, a cross frame member connecting the outer ends thereof, a cross frame member connecting the side frame members intermediate their ends having an apertured boss thereon, bearing members rigidly secured to the front ends of the side frame members, stud attaching members adapted to attach the bearing members to a car frame, a stud member attached to said car frame and engaging in said boss, truck wheels and axle, a spring supporting the truck frame thereon, and means for driving the axle from the power plant of the car to which the truck unit is attached.

6. In combination with an automobile chassis, a truck unit comprising a truck frame, driving wheels and spring suspension, apertured members rigidly secured to the front end of the chassis, a shaft supported by said members for attaching each side of the truck frame to the side frame of the chassis at different elevations, and means for suspending the rear end of the automobile chassis frame from the truck frame.

7. In a truck unit a pair of side frames, cross frame members, boss means secured to the cross frame members, stud attaching means on the chassis of an automobile adapted to engage said boss means, and truck supporting wheel adapted to be driven from the motor of the automobile to which the truck unit is attached.

8. In a device of the class described, the combination with an automobile chassis, of a truck frame comprising side members and cross members, bosses secured to the side and cross frame members, stud members secured to the chassis frame engaging said bosses to connect the chassis frame and the truck frame together, rear truck wheels, springs supporting the truck frame from the truck wheels, and mechanism for driving the truck wheels from the power plant of the automobile.

In testimony whereof I have hereunto subscribed my name in the presence of two subscribing witnesses.

ALBERT E. COOK.

Witnesses:
 EARL M. HARDINE,
 LAWRENCE REIBSTEIN.